No. 729,269. PATENTED MAY 26, 1903.
H. W. BUCK.
TRANSMISSION OF POWER.
APPLICATION FILED FEB. 7, 1901.
NO MODEL. 2 SHEETS—SHEET 2.
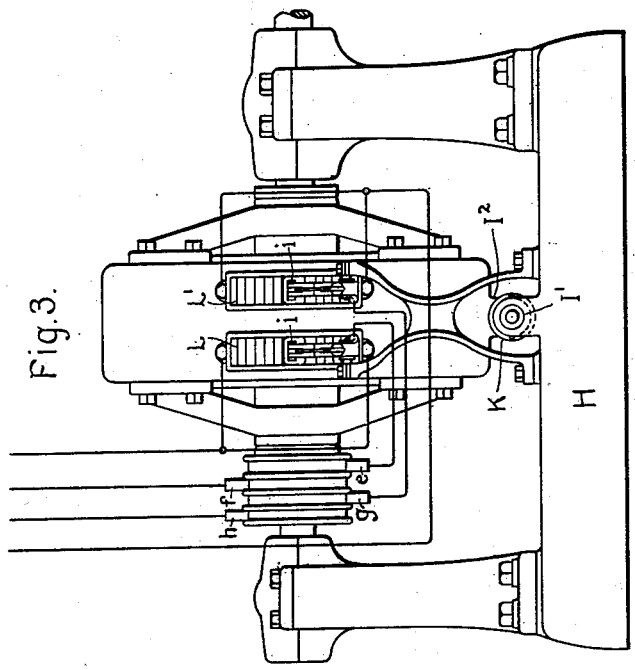
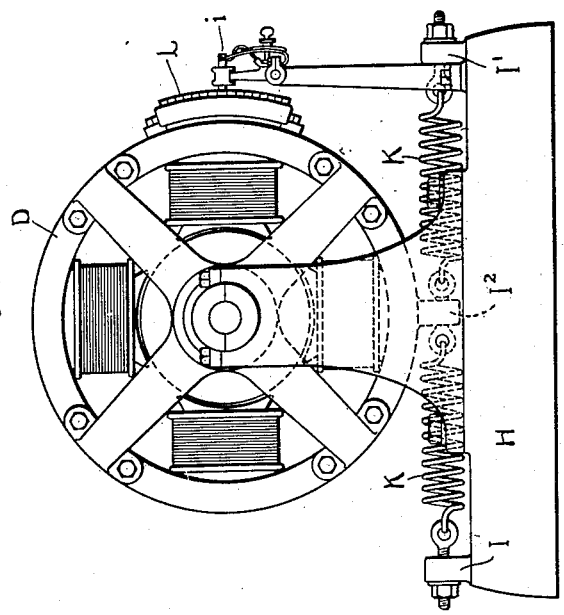
Witnesses.
John Ellis Glenn
Benjamin B. Hill
Inventor.
Harold W. Buck,
by Albert G. Davis
Atty.

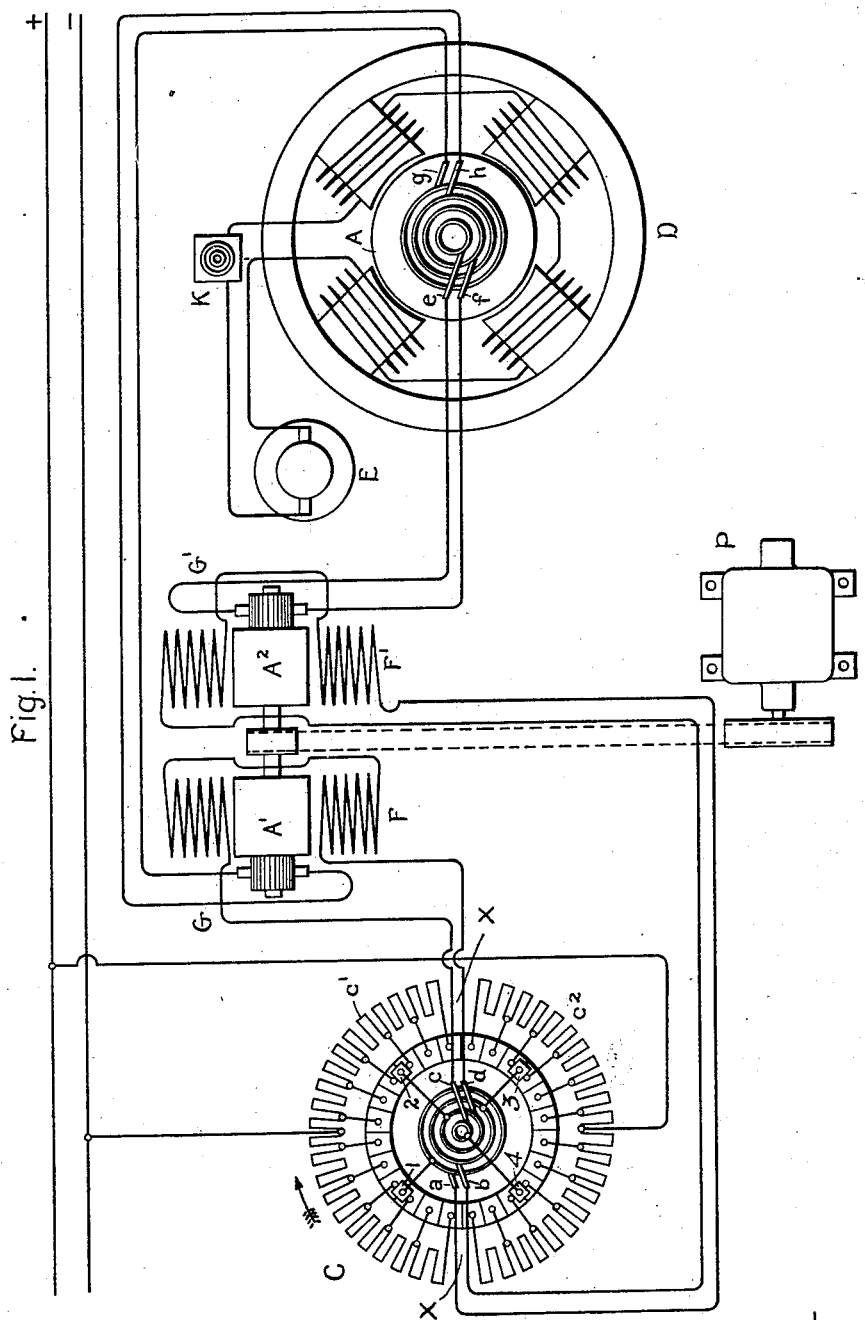

No. 729,269. Patented May 26, 1903.

UNITED STATES PATENT OFFICE.

HAROLD W. BUCK, OF NIAGARA FALLS, NEW YORK, ASSIGNOR TO GENERAL ELECTRIC COMPANY, A CORPORATION OF NEW YORK.

TRANSMISSION OF POWER.

SPECIFICATION forming part of Letters Patent No. 729,269, dated May 26, 1903.

Application filed February 7, 1901. Serial No. 46,308. (No model.)

*To all whom it may concern:*

Be it known that I, HAROLD W. BUCK, a citizen of the United States, residing at Niagara Falls, in the county of Niagara, State of New York, have invented certain new and useful Improvements in Transmission of Power, of which the following is a specification.

This application is a continuation of my application, Serial No. 681,972, filed May 28, 1898. My invention relates to the electrical transmission of power, and has for its object to provide an improved means for transmitting a motion synchronous with that of a hand-operated or other device acting as a controller, yet with any required augmentation of the power, so that mechanism at a distance may be driven at proper speed or power within the capacity of the generating source, yet be under the direct control of the operator either from a single place or from any one of several positions.

In carrying out my invention I employ a plurality of generators of the direct-current type driven from any desired source of power and supplying current to a motive device similar in its general construction to the ordinary polyphase motor, and I provide a rotatable translating device connected in circuit between the field-windings of the said dynamo-electric machines and any convenient source for successively and similarly varying the field excitation of the said generators, the current in the field-circuit of each machine being gradually increased to a maximum, then as gradually decreased, then reversed and increased to a negative maximum, and then decreased until the cycle has been completed.

The motive device is electrically connected to the translating device through the direct-current generators. These generators constitute what may be termed "electrodynamic intensifying devices" for augmenting the power transmitted by the translating device. By operating the translating device at any desired speed I am enabled to cause the electromotive forces produced by the several generators to vary gradually in like manner as the fields are varied, the variations in the electromotive force of one machine following those of the other, so that the currents produced in the circuits of the generators have their corresponding values displaced in time by an amount depending on the speed of operation of the rotatable translating device, thereby producing in the circuits of the generators currents which when the translating device is being rotated have all the characteristics of alternating dephased currents, but which are constant in value when the translating device is stationary, the volume of the currents in the latter case being dependent upon the position of the brushes on the translating device.

Referring to the accompanying drawings, Figure 1 shows diagrammatically the apparatus and circuit connections necessary for carrying out my invention. Figs. 2 and 3 show in side and end elevation, respectively, a motive device suitable for the application of the invention, having an automatic current-limiting device attached thereto.

In Fig. 1, C indicates the rotatable translating device supplied with current from any suitable direct-current source. G G' are two generators driven from any suitable source of power, the said source being indicated in the drawing as a motor P, and D represents the motive device to be operated. The plus and minus mains are supplied with continuous current at any desired potential, and taps from these mains are led to points near the middle of the two resistances $c'$ $c^2$ of the translating device. Contacts connected at intervals to these resistances are arranged in a circle, so that the brushes 1 to 4, inclusive, may be continuously rotated thereon. These brushes are connected to collecting-rings with which the stationary brushes $a$ $b$ $c$ $d$ make contact. The opposite brushes 1 and 3 are connected to the collector-rings which make contact with the fixed brushes $a b$, and the opposite brushes 2 and 4 are connected with other collector-rings which make contact with the brushes $c d$. The fixed brushes $a$ $b$ are connected to the terminals of the field-winding F' of the generator G', and the fixed brushes $c$ $d$ are correspondingly connected to the terminals of the field-winding F of the generator G. The motive device D, as shown in the drawing, has the construction of a synchronous motor, the field-winding being excited from an auxiliary generator E, although it might be supplied with current from the mains, and a rheostat K is provided for the purpose of regulating the current in the field-magnet circuit. The armature A of the machine D is provided with a two-phase winding connected to the collector-rings with which the fixed brushes $e\ f\ g\ h$ are in contact. The commutator-brushes of the generator G are connected to the brushes $g$ and $h$ of the machine D, and the commutator-brushes of the generator G' are connected to the fixed brushes $e$ and $f$ of the machine D. By tracing the circuits it will be seen that in the illustrated position of the brushes on the translating device C current will enter from the plus side of the circuit to the middle point of the rheostat $c^2$, where it will divide, part passing to the left to the rheostat-brush 4, to the collector-ring and the brush $c$, thence through the field-winding F of the generator G, and back to the brush $d$, and through the collector-ring to the rheostat-brush 2, and through part of the resistance $c'$ to the minus main. Current also passes to the right, to the rheostat-brush 3, and through the collector-ring to the fixed brush $b$, whence the circuit is completed through the field-winding F' of the generator G', back to the brush $a$, and through the collector-ring to the rheostat-brush 1 and through part of the resistance $c'$ also to the negative main. If the translating device C be maintained stationary in its position, the field of the generators G and G' will be equally excited, and currents of equal value will be supplied therefrom to the armature of the motive device D, and the said armature will be rigidly held in fixed position with relation to the field-poles of the machine. If, however, the brushes 1 to 4 of the translating device are rotated in a clockwise direction, as shown by the arrow, it will be seen that the resistance of the circuit including the brushes 4 and 2 and the field-winding F will be gradually increased, while the resistance of the circuit including the brushes 1 and 3 and the field-winding F' will be correspondingly decreased. The current supplied to the field-winding F will therefore be progressively reduced and the current supplied to the field-winding F' will be progressively increased, until at the time when the brushes 4 and 2 lie across the gap X X between the two rheostats the current in the field-winding F will be reduced to zero and the current in the field-winding F' increased to a maximum. As the brushes 2 and 4 pass across the gap X X the connections between the field-winding F and the source will be reversed, and the current will flow in the reverse direction, starting from the brush 2 instead of from the brush 4, as before, and then as the brushes are further rotated the current in the field-winding F will be increased in the reverse direction until the brushes 1 and 3 reach the gap X X, when the current in the field-winding F will begin to decrease, and the current in the field-winding F' will be reversed. Thus it will be seen that as the brushes 1 to 4 are rotated over the resistance-contacts two-phase currents will be derived from the continuous-current mains, the frequency of the currents being determined by the velocity of rotation of the brushes 1 to 4. The electromotive forces of the generators G and G' will vary in like manner as the currents in their field-circuits vary, and the currents produced by the generators G and G' will therefore be two-phase currents, having a frequency determined by the velocity of rotation of the brushes 1 to 4 of the translating device. The motive device D being of the synchronous type will rotate at the same rate as the brushes of the translating device, and as long as these brushes remain stationary the armature A will also remain stationary. To reverse the direction of rotation of the motive device, it is only necessary to rotate the brushes of the translating device in the reverse direction, when the actions just explained will take place in the reverse sense.

By my invention I am enabled to successfully control the application of large powers, involving the use of currents of large volume, without introducing or removing resistance from the circuit of the motive device, the system being controlled by varying only the small currents which are required for exciting the fields of the generators G and G'.

As the armature of the motor must frequently start from rest and will always run at only moderate speed, there is apt to be a rush of current through it whenever it is started, on account of its low counter electromotive force. To obviate this difficulty, I connect in the main circuit a resistance sufficient to limit the current at starting to that desired and mount the field-magnets of the motor in such a way that they may have a limited rotary movement. Suitable springs or weights oppose this motion. The resistance already named is so connected that when the motor-armature exerts no torque the yoke carrying the field-magnets takes a neutral position, so that the greatest amount of resistance is included in circuit. When, however, the armature is put in rotation and exerts torque, the yoke will be displaced until when maximum current is required the resistance will be all cut out.

Any equivalent torque-responsive mechanism may be substituted for the pivoted field-magnet yoke. This arrangement is illustrated in Figs. 2 and 3, in which the parts are similarly lettered. H is the base of the motor. I I' are lugs on the base, to which are attached springs K K, the other ends being connected to the lug I² on the magnet-frame. Resistances L L' are shown in each of the armature-circuits. Brushes $i\ i$ reciprocate over the rheostat-contacts. Each of these brushes is connected to one of the collector-brushes of the motor-armature. The operation of this part of the invention will be sufficiently apparent from the description already given.

Although I have shown the motive device as an alternating-current motor of the synchronous type, it is evident that the field-magnet might be provided with a short-circuited winding, in which case, however, the rotation of the motive device would not be synchronous with that of the translating device, and although I have shown my invention as embodied in a two-phase system it is evident that a greater number of generators might be used, if desired, the armature-winding of the motive device D being in this case provided with another set or sets of collecting-rings.

What I claim as new, and desire to secure by Letters Patent of the United States, is—

1. In combination, a source of direct current, a motive device, a plurality of electrodynamic intensifying devices, a plurality of circuits connecting said source to said intensifying devices, means for introducing resistance into one of said circuits and simultaneously withdrawing resistance from another of said circuits and circuit connections between said motive device and said intensifying devices.

2. Means for transmitting a synchronous movement comprising a plurality of rheostats independently connected to a source of direct-current supply, a plurality of sets of brushes mounted for rotation over the rheostat-contacts, a plurality of electrodynamic intensifying devices, circuits each including one of said sets of brushes and one of the windings of the said intensifying devices, a motive device and other circuits each including a winding on the intensifying devices and one of the circuits of the motive device.

3. In combination, a plurality of dynamo-electric machines, a source of power for operating said machines, a source of direct-current supply, means for supplying from said direct-current source to the field-windings of the dynamo-electric machines a plurality of successively-varying currents, a motive device, and means for conveying the currents generated by the armatures of said dynamo-electric machines to the winding or windings of said motive device.

4. In combination, a plurality of dynamo-electric machines, a source of power for operating said machines, a source of direct-current supply, circuits connecting said direct-current source with the field-windings of the several dynamo-electric machines, means for introducing resistance into one of said circuits and simultaneously withdrawing resistance from another of said circuits, a motive device, and means for conveying the currents generated by the armatures of said dynamo-electric machines to the winding or windings of said motive device.

5. In combination, a plurality of dynamo-electric machines, a source of power for operating said machines, a source of direct-current supply, circuits connecting said direct-current source with the field-windings of the several dynamo-electric machines, means for introducing resistance into one of said circuits and simultaneously withdrawing resistance from another of said circuits, a motive device, means for conveying the currents generated by the armatures of said dynamo-electric machines to the winding or windings of said motive device, and means, dependent upon the torque of the motive device, for limiting the current supplied thereto.

In witness whereof I have hereunto set my hand this 5th day of February, 1901.

HAROLD W. BUCK.

Witnesses:
BENJAMIN B. HULL,
MARGARET E. WOOLLEY.